United States Patent [19]
Davis, Jr. et al.

[11] Patent Number: 5,579,895
[45] Date of Patent: Dec. 3, 1996

[54] CROSSPUSH CONVEYOR FOR CARTON LOADER

[75] Inventors: Ellis W. Davis, Jr., Deerwood; Allen J. Thielman, Brainerd, both of Minn.

[73] Assignee: Davis Engineering LLC, Deerwood, Minn.

[21] Appl. No.: 346,877

[22] Filed: Nov. 30, 1994

[51] Int. Cl.$^6$ .................................................. B65G 47/26
[52] U.S. Cl. ........................ 198/456; 198/474.1; 198/598
[58] Field of Search ................................... 198/456, 457, 198/474.1, 598, 732; 53/251, 252

[56] References Cited

U.S. PATENT DOCUMENTS

| | | | |
|---|---|---|---|
| 3,778,959 | 12/1973 | Langen et al. | 53/26 |
| 3,956,868 | 5/1976 | Ganz et al. | 53/48 |
| 3,990,572 | 11/1976 | Fishback | 198/458 |
| 4,776,448 | 10/1988 | Kulig | 198/474.1 X |
| 4,804,076 | 2/1989 | Pace | 198/456 X |
| 4,936,077 | 6/1990 | Langen et al. | 53/543 |
| 4,982,551 | 1/1991 | Nigrelli, Sr. | 53/55 |
| 5,052,544 | 10/1991 | Anderson | 198/456 |
| 5,241,806 | 9/1993 | Ziegler et al. | 53/566 |

OTHER PUBLICATIONS

Prior art Photos and drawings of a carton loading machine manufactured by Mead Corporation.

*Primary Examiner*—James R. Bidwell
*Attorney, Agent, or Firm*—Westman, Champlin & Kelly, P.A.

[57] ABSTRACT

A crosspush conveyor moves cans laterally of a can conveyor into cartons that are also moving at the same speed as the can conveyor. The crosspush conveyor is mounted on a pair of sprockets that support roller chains to form two straight lengths, with the lengths being positioned at an angle relative to the direction of movement of the can conveyor. A plurality of paddles or pushers are mounted onto the chain conveyor and are pivotally mounted so that they can pivot away from a working position as they move through a selected portion of their path of travel. The paddles are supported in a working position on guide rails to hold the pusher members so that they will move cans laterally of the can conveyor on one side of the conveyor. The crosspush conveyor operates without a separate control cam for holding the crosspush members in position throughout the travel of the conveyor.

13 Claims, 9 Drawing Sheets

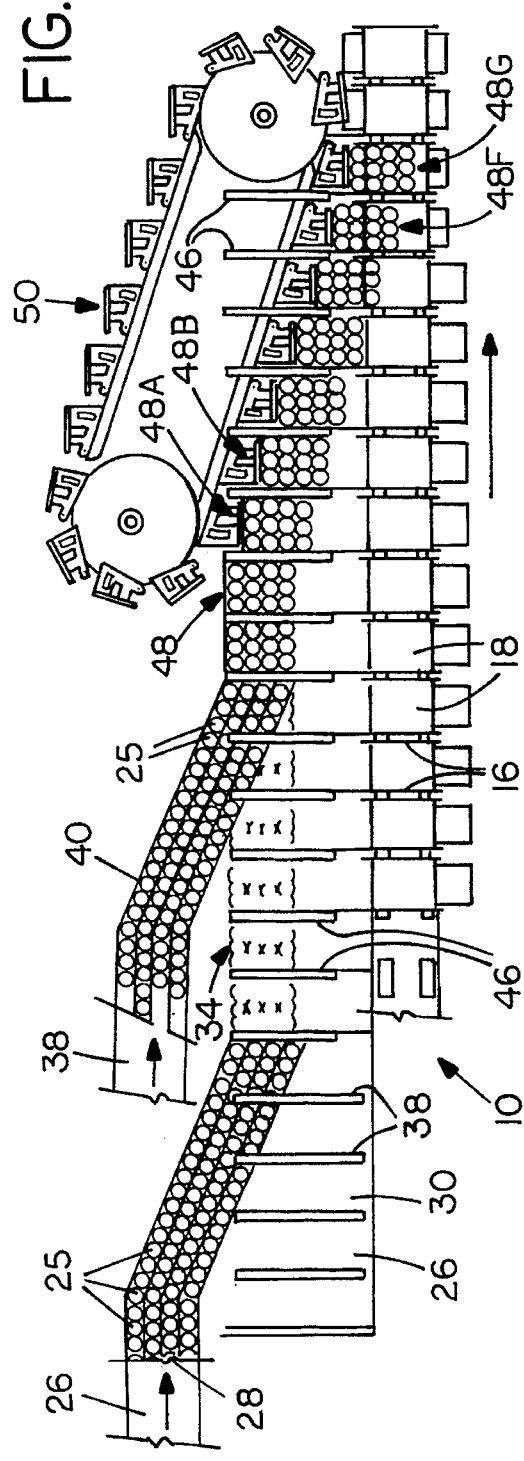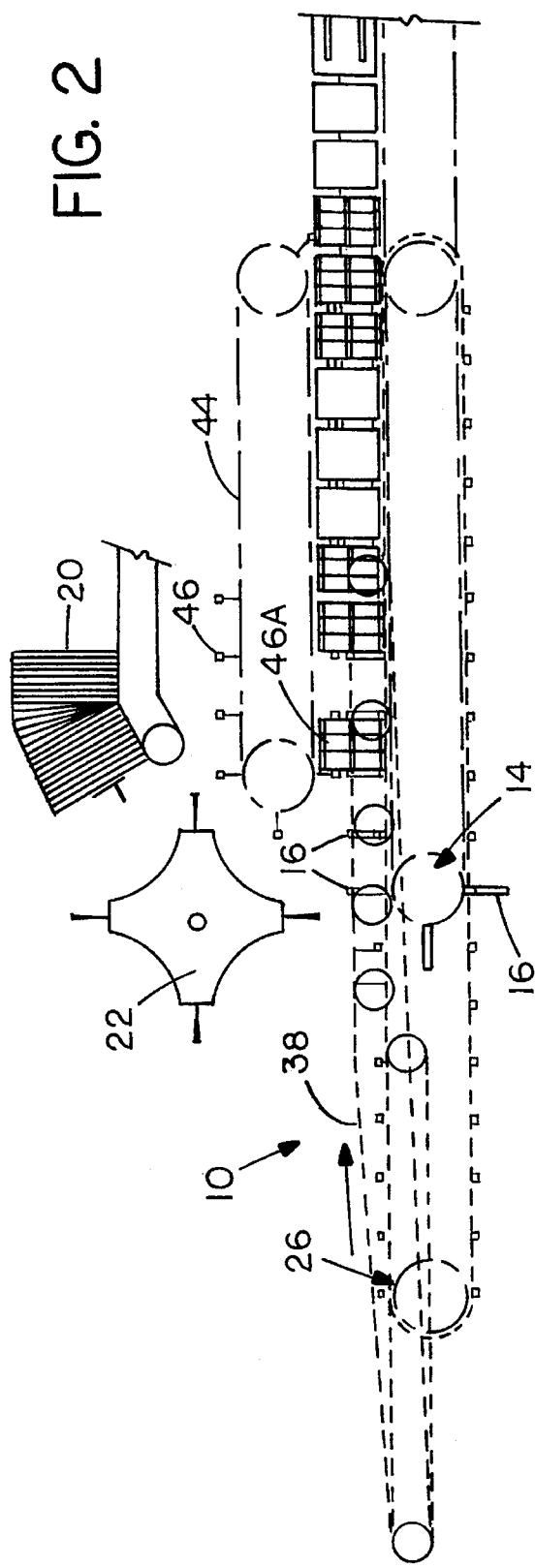

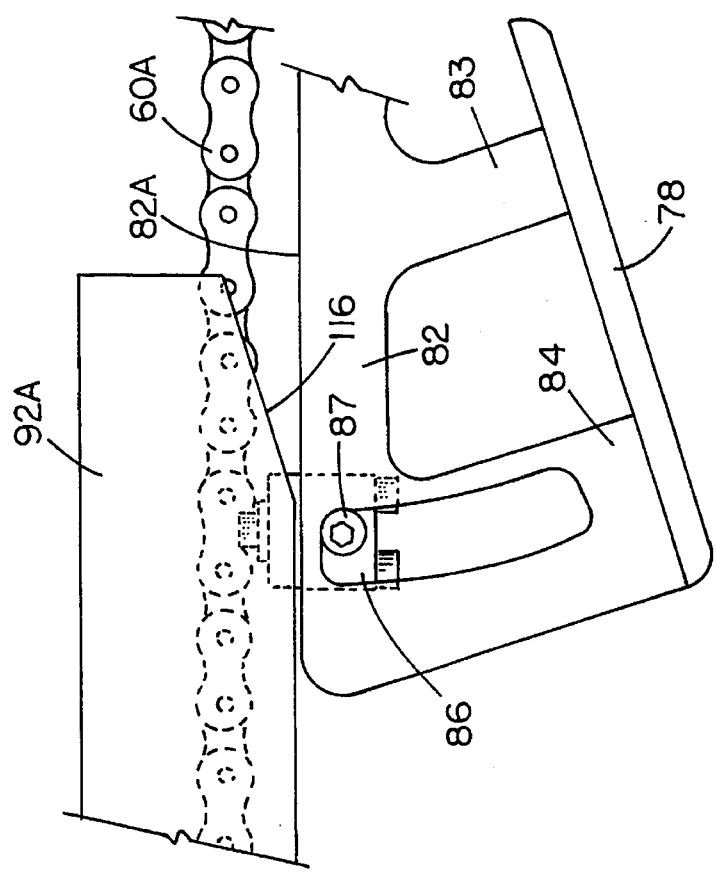
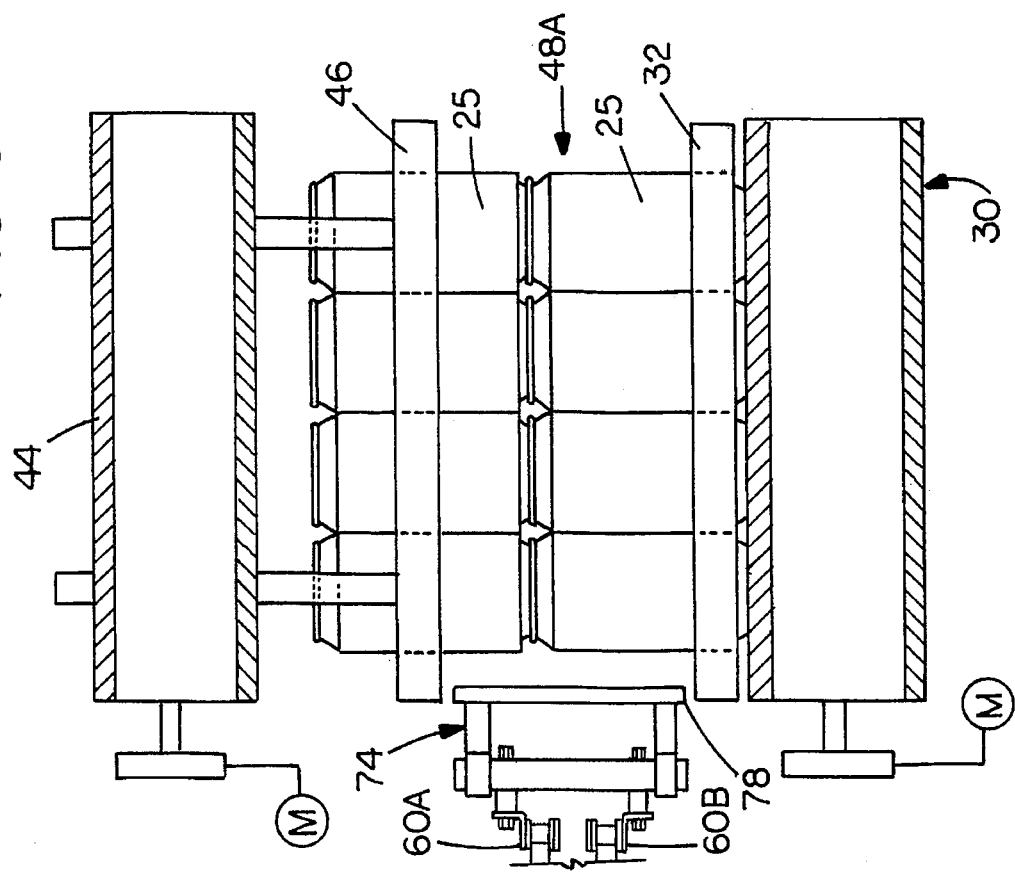

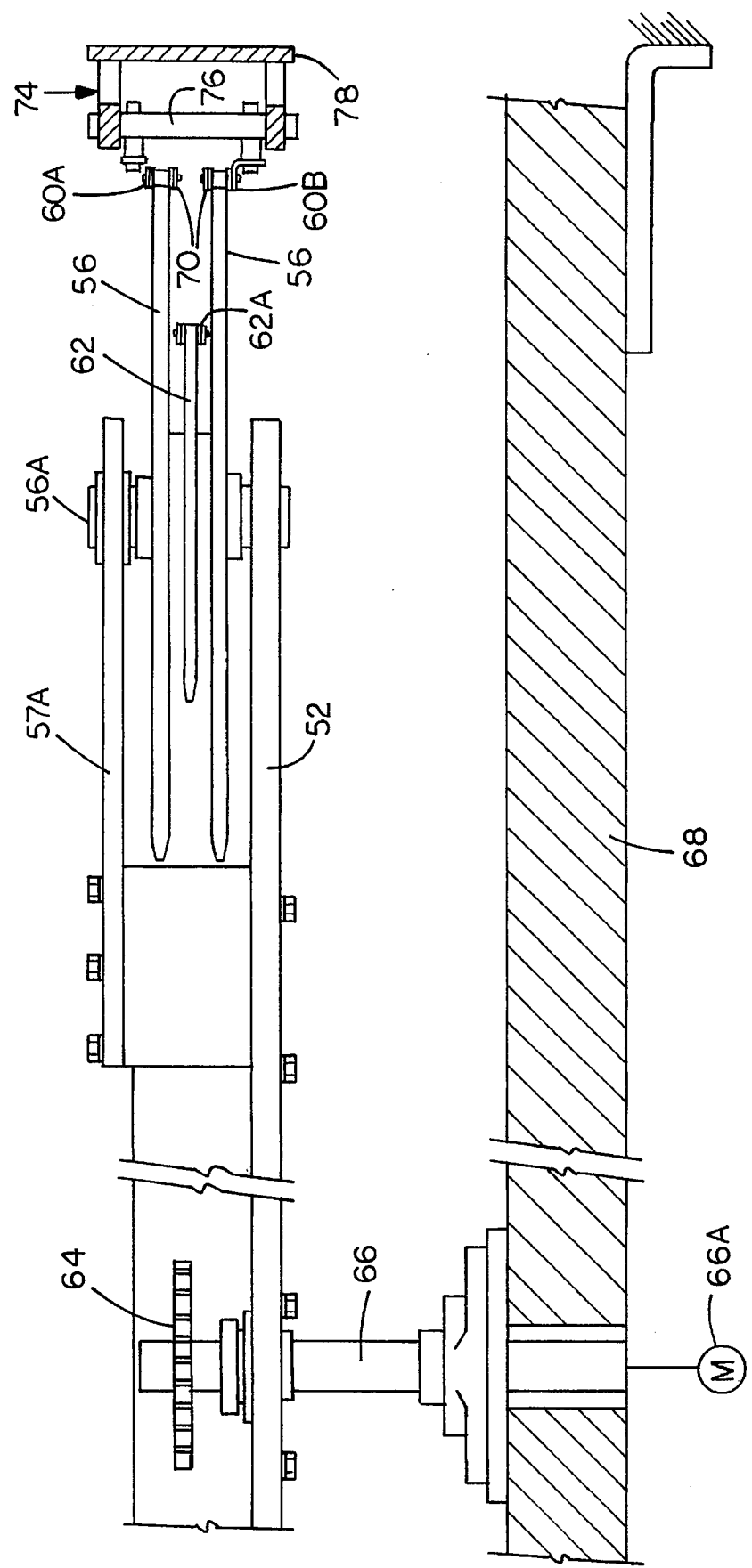

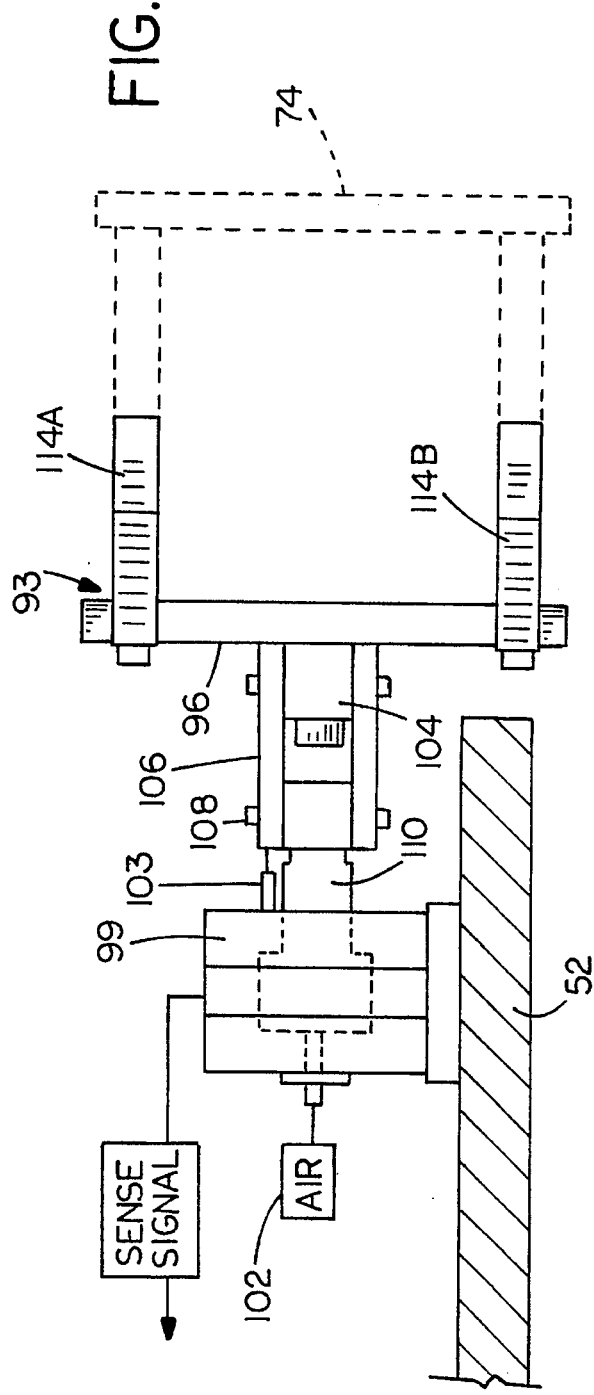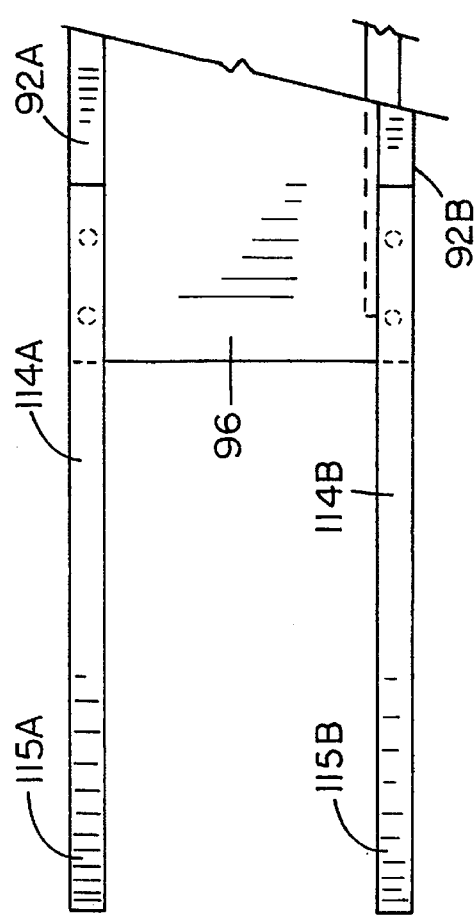

CROSSPUSH CONVEYOR FOR CARTON LOADER

BACKGROUND OF THE INVENTION

The present invention relates to a crosspush conveyor which will push groups or clusters of cans or articles into outer cartons as the cans and cartons are being conveyed parallel and in synchronization with each other.

In the prior art, various tray and carton loaders have been advanced. U.S. Pat. No. 5,052,544 shows a can loader pusher which is positioned to move at an angle relative to movement of a conveyor that carries groups of cans for loading the cans into outer sleeves. The pusher causes groups of cans to move laterally of the conveyor carrying the cans and uses a cam and follower arrangement to load the cans into open ended outer sleeves.

U.S. Pat. No. 4,237,673 to Calvert et al. also shows a typical carton grouping and loading device which utilizes conveyors carrying the cans, and segregating them into opposite ends of an outer sleeve or carton. The principle of providing divider rails and conveyors that will form the cans into proper sized groups for loading is shown in this patent, as well as in U.S. Pat Nos. 3,990,572 and 4,982,551.

SUMMARY OF THE INVENTION

The present invention provides a simplified apparatus for repeatably loading articles such as cans into outer packaging sleeves from one end, and is usable when the cans are stacked two high so two layers of cans are loaded. The present crosspush conveyor smoothly inserts groups of articles, such as packages, cans or bottles, even when stacked, from cartoning machine product conveyors into assembled or opened sleeves or cartons for holding the groups of cans. The crosspush conveyor is simply made, and utilizes a pivoting paddle or pusher that will push the package groups in the proper lateral direction as the packages are conveyed longitudinally by a conveyor without the need for a complicated cam track and cam follower arrangement. The crosspush conveyor is synchronized with a conveyor moving the opened outer carton or sleeves, which are loaded with the groups of packages or cans.

Thus, a simplified, very reliable sleeve or carton loader is advanced. The mounting for the pusher or paddle is used for sensing jams or problems in pushing groups of packages or cans into the sleeves and for providing a signal that will permit stopping the conveyors to insure that any loading problems can be rectified before they are compounded.

BRIEF DESCRIPTION OF THE DRAWINGS

FIG. 1 is a schematic top plan representation of an outer carton or sleeve loading machine with which the loading mechanism of the present invention is utilized;

FIG. 2 is a schematic representation of a side view of the device in FIG. 1 showing package and outer carton conveyors in schematic form;

FIG. 5 is an enlarged part schematic sectional view taken as on line 5—5 of FIG. 3;

FIG. 5A is sectional view taken generally along line 5A—5A in FIG. 3;

FIG. 6 is an enlarged top plan view of a paddle used with the crosspush conveyor of the present invention;

FIG. 10 is a view taken generally along line 10—10 in FIG. 9; and

FIG. 11 is a view taken along line 11—11 in FIG. 9.

DETAILED DESCRIPTION OF THE PREFERRED EMBODIMENTS

Figure 3:
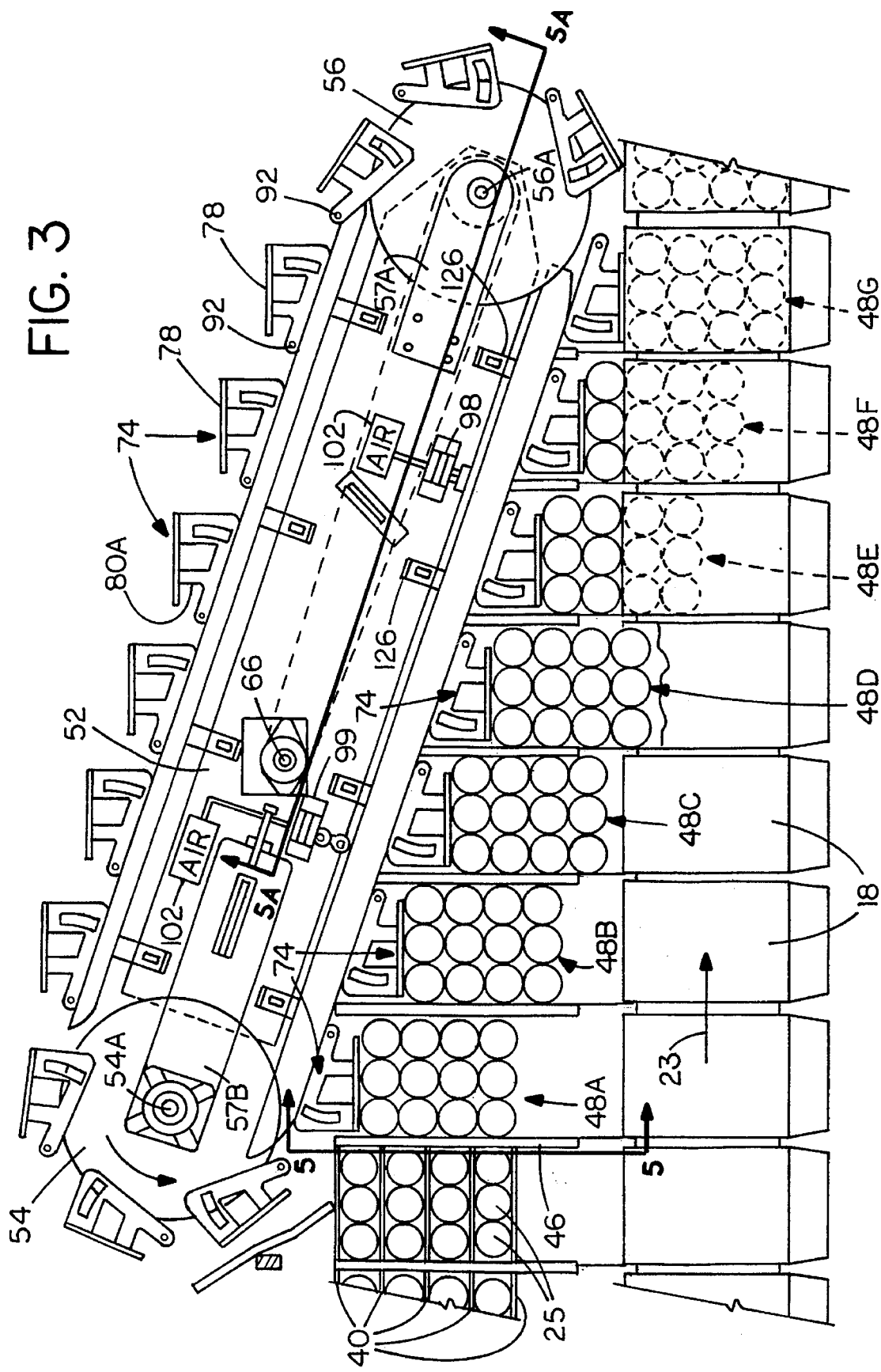
FIG. 3 is an enlarged top plan view of a crosspush conveyor made according to the present invention illustrating various stages of inserting groups of cans into outer sleeves or cartons.

A machine arrangement for loading packages, specifically cans, into outer sleeves or cartons is shown schematically at 10 and includes a table or frame 12 that has components mounted on and along side of it, including an outer carton or sleeve conveyor shown in dotted lines at 14 in FIG. 2, that has individual carton push members 16 that push cartons 18 that have been opened or erected and provided from a carton supply 20. The carton erection or opening mechanism shown generally at 22 is selected to provide the erected carton between the pusher members 16, so that as the conveyor 14 moves the cartons 18 in direction indicated by the arrow 23, the cartons are moved to a selected position and have open end flaps that are handled in a normal manner. Additionally, a source of cans is provided and feeds cans 25 onto a first lower level product conveyor 26, that is operated in a normal manner, and which conveys the cans through divider rails 28. The cans are divided into individual rows as can be seen, and are fed onto a lower can or product conveyor 30. The lower can conveyor 30 has can separating flights 32 that separate the lower cans into lower groups of twelve cans, as shown, after which the groups of cans are conveyed along in the region shown generally at 34 and a separator sheet is placed over the lower group of cans.

A can supply also feeds a separate upper level product conveyor 38 which moves the cans along divider rails 40, so that the cans on conveyor 38 are divided into individual lines shown schematically, and these cans are then fed by a series of secondary product conveyors 42 along the divider rails into a position wherein the cans on conveyors 42 will overlie the separator sheets on the top of the lower group of cans. The upper level of cans are moved over the groups of cans on the lower conveyor 38 and as they are moved the cans on the upper level are separated into individual groups utilizing an upper can separating conveyor 44 which has separator-pusher bars 46 that extend out from the conveyor so that the separator-pusher bars 46 will be fed in between selected lines of cans as the cans move forwardly as shown schematically at 46A in FIG. 2.

This arrangement uses conventional can feeding and separating conveyors that are of known design. As the stacked groups of cans are carried by conveyor 26 in direction indicated by the arrow 23 the groups of cans 48 are moving parallel and synchronized with the conveyor 14 so the groups of cans move individual groups of cans shown at 48, are moving at the same speed as the cartons and are aligned with the open ends of the cartons 18. When pushed laterally the groups of cans will slide into the cartons 18.

A crosspush conveyor assembly of the present invention is illustrated generally at 50, and is arranged so that it will move the groups of cans such as that shown at 48A, 48B, 48C, 48D, 48E, 48F and 48G laterally of the direction of movement of the cartons 18, while both the cartons 18 and the groups of cans continue to move in direction as indicated by arrow 23. Thus the crosspush conveyor moves the groups of cans laterally into the cartons in stacks. After that, the cartons 18 are suitably closed in a normal manner.

It is to be understood that suitable guides will be used for maintaining the carton end flaps open and in aligned positions for insertion of the respective groups of cans.

In FIG. 3, the conveyor 50 as shown is mounted onto a support plate 52, turn is supported in a suitable manner from a frame, in a position that is above the conveyor 42, as well as the conveyor 30 for conveying the groups of cans relative to and along side the cartons in which they are to be packed. The support for plate 52 is shown only schematically in FIG. 4, and can take any desired form.

Plate 52 is used for mounting a first set of sprockets 54 at a first end of the conveyor, and a second set of sprockets 56 at an opposite drive end. The sets of sprockets 54 and 56 each include vertically spaced conveyor chain sprockets mounted onto common shafts 54A and 56A, respectively. The conveyor chain sprockets are used for supporting and driving vertically spaced endless flexible members, as shown roller chains 60A and 60B, respectively. The shafts 54A and 56A are held in bearings on plate 52 and on flanges 57A and 57B, which are supported on, but spaced from, the plate 52.

In addition, the sprocket 56 includes a drive sprocket 62 that is shown in FIG. 5A. The drive sprocket 62 is driven with the chain 62A from a sprocket 64 that in turn is mounted onto a drive shaft 66 mounted on suitable bearings on plate 52 and a lower support frame 68. The shaft 66 is driven with a suitable motor 66A that is controlled to be at the proper speed for synchronizing movement desired. The roller chains 60A and 60B extend between the sprocket and form two straight lengths of chain, one being a loaded or work side and the other being the return side.

Figure 4:
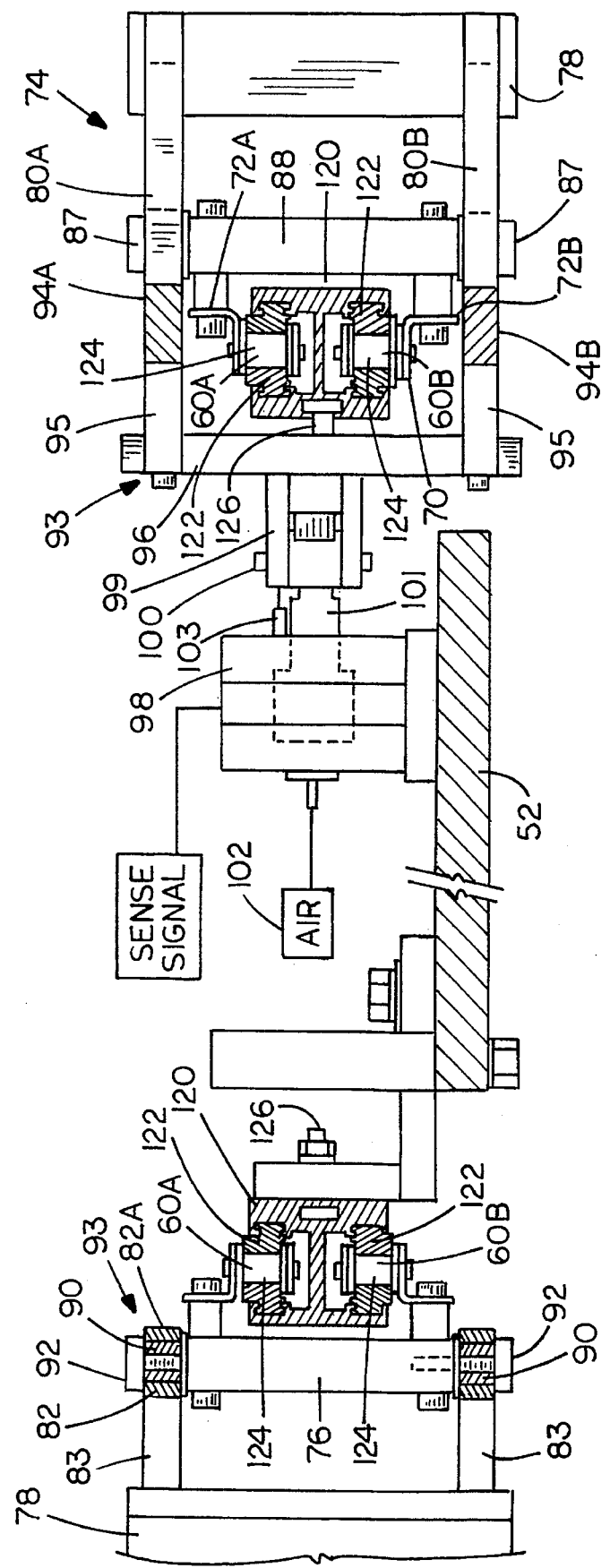
FIG. 4 is a sectional view taken as on line 4—4 in FIG. 3.

The roller chains 60A and 60B include a series of spaced attachment links 70 as illustrated in FIG. 4, for example. Attachment links 70 each include a flange member 72A that has a leg bent upwardly on the upper chain 60A, and the lower chain attachment link has a flange member 72B, which has a leg bent downwardly. These flanges 72A and 72B in turn are used to support mounting blocks to pivotally support and attach pusher paddle assemblies 74 (also called paddles) for movement with the chain as it is driven.

Figure 4A:
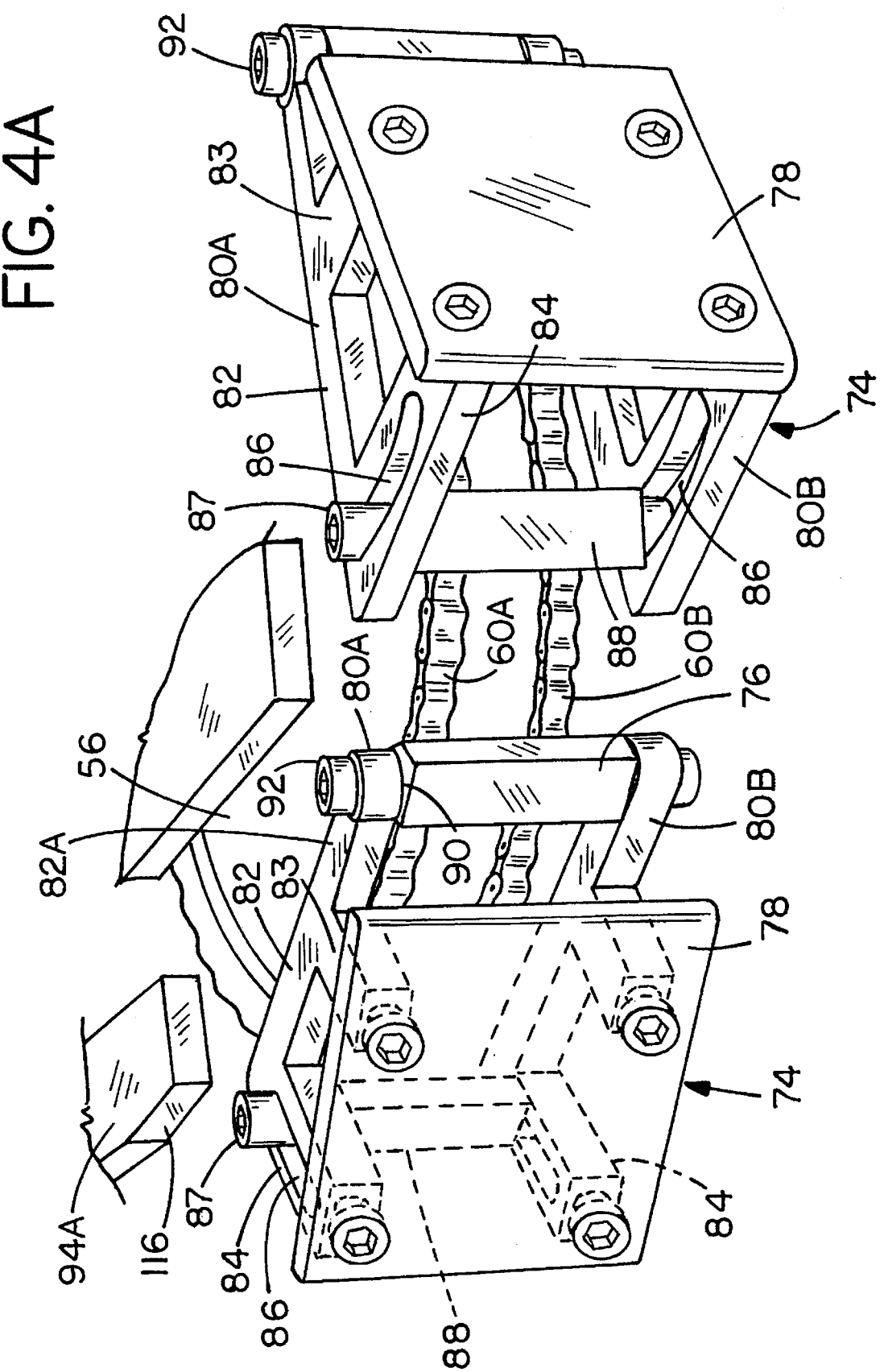
FIG. 4A is a fragmentary perspective view of paddles mounted to a conveyor moving around a chain drive sprocket.
Figure 8:
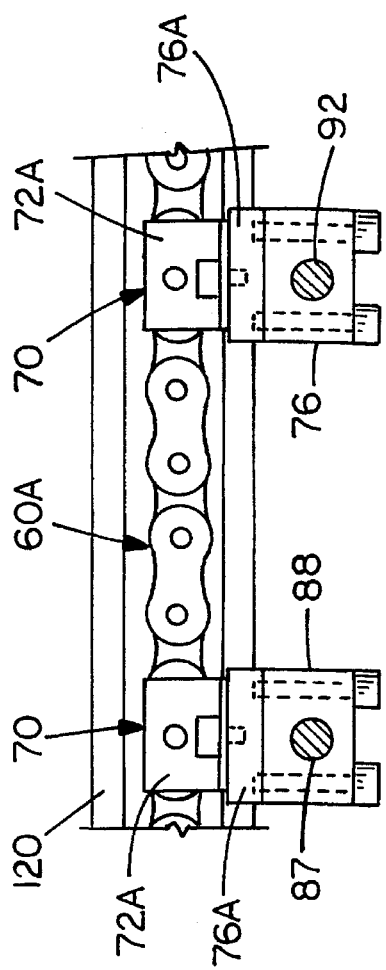
FIG. 8 is a fragmentary enlarged view taken as on line 8—8 in FIG. 7.

Referring to FIGS. 4, 4A and 8, a vertical mounting block 76 is attached to aligning flange members 72A and 72B of a leading set of flange members using spacers 76A. There are two sets of chain attachment links 70 for each pusher paddle assembly 74. The pusher paddle assemblies have leading ends 74 mounted on pivot connections at the top and bottom of mounting blocks 76. The pusher paddle assemblies 74 include a pusher or paddle plate 78, that is attached to a pair of spaced apart plate like supports 80A and 80B, respectively. The plate like supports 80A and 80B are flat members each of which has an elongated base rail portion 82 and a pair of support legs 83 and 84 extending from the base. The support legs 83 and 84 have end surfaces lying in a plane which, as shown in FIG. 6, support the pusher paddle 78 at an angle relative to the base support surface 82A of the base rail 82.

The rear or trailing leg 84 of each plate like support 80A and 80B has a slot 86 defined therein, and the slots are used for permitting, but limiting, pivotal movement about the leading end of the pusher paddle assemblies 74 within a range of movement. A shoulder bolt 87 is supported at each end of a trailing mounting block 88 that is similar to mounting block 76 and is attached to a trailing set of chain attachment links, each including flange members 72A and 72B, as shown in FIG. 8. The shoulder bolts 87 thread into and stop against the upper and lower surfaces of the respective mounting block 88. The shoulder bolts 87 extend through the slots 86 so that the range of travel or pivoting on the pusher paddle assemblies 74 about the forward end pivot is limited.

The forward ends of the rails 82 of supports 80A and 80B have bores that receive bushings or sleeves 90 that on the top and bottom of the block 76. Cap screws 92 are positioned in the bores of the bushing and are threaded into the ends of block 76 for the respective pusher paddle assembly 74 to provide a pivot for the pusher paddle assembly about the axis of the cap screws 92, as shown in FIGS. 3, 4A and 6. This axis is perpendicular to the support plane of the product conveyor. This will permit each pusher paddle assembly 74 to move between an extended working position as shown where the pusher paddle is engaging a group of cans, to a retracted position where the pusher assembly is permitted to pivot inwardly when the pusher paddles move around the respective sprockets 54 and 56 at the ends of the crosspush conveyor 50.

The pusher paddle assemblies 74 are held in place at its forward end on the pivots at cap screws 92, and each has a guide shoulder bolts 87 operating in the slots 86 at its rear or trailing portion. The pusher paddle assemblies 74 are not controlled in pivotal movement other than by a pusher paddle support or rail assembly 93 on the drive side of the crosspush conveyor including a pair of guide rails shown at 94A and 94B in FIG. 4, aligned with the rails 82 of the pusher paddle assemblies. The guide rails 94A and 94B are slidably engaged by the surfaces 82A of each of the rails 82 at the top and bottom of each pusher paddle assembly. The guide rails 94A and 94B are held with suitable standoff supports 95 which in turn are bolted onto a vertical web 96 forming part of rail assembly 93. The webs 96 are located at desired longitudinal intervals sufficient to support the guide rails 94A and 94B adequately to hold the pusher paddle assemblies 74 in working position.

The web 96 and rails 94A and 94B are on the drive side of the plate 52, which is the side adjacent the groups of cans, and in turn are mounted with a pair of pneumatic cylinder sensing supports 98 and 99, which are mounted onto the support plate 52. As shown in FIG. 4, the web 96 is mounted on and supported by the pneumatic cylinder 98 through a pivot bracket 99 that is attached to one web 96 adjacent the exit end of the crosspush conveyor. A pivot pin connection 100 connects the pivot bracket 99 to a piston rod 101 of the cylinder 98. An internal piston and chamber is shown in dotted lines, and the piston rod 101 is loaded in direction outwardly through the use of suitable air under pressure from an air source 102, which can be under a regulated pressure. A sense signal from a sensor, such as an LVDT103 can be provided to indicate the position of the rod 101.

Figure 7:
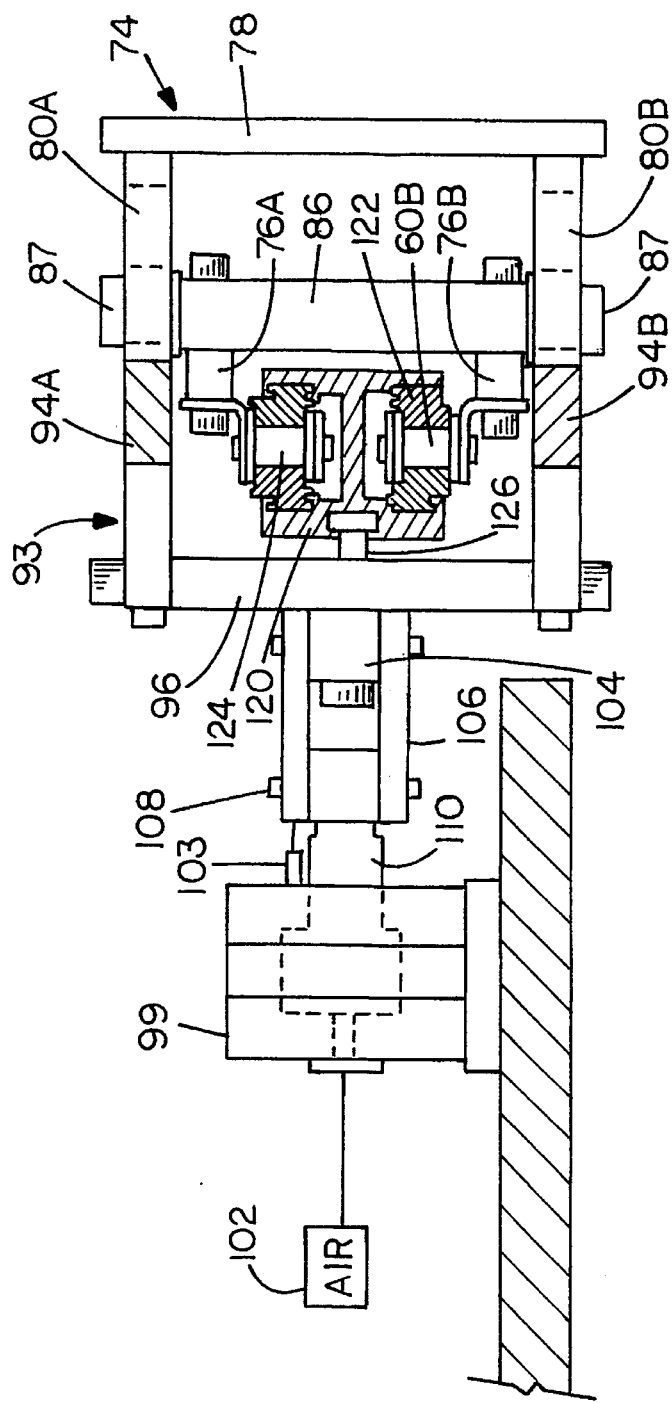
FIG. 7 is an enlarged sectional view or a pivoting support for paddles of the present invention.

The rail assembly 93 and thus, the guide rails 94A and 94B are also controlled about the pivot of the bolt 100 through the use of the pneumatic cylinder 99, which is also attached to one of the webs 96, as shown in FIG. 7, but closely adjacent the inlet end sprockets 54. A pivot block 104 is attached to the web 96, and a chain link 106 is pivotally mounted on block 104 and also, at an opposite end, is pivotally mounted as at 108 to a piston rod 110 of the pneumatic cylinder 99, which again is supplied with air under pressure from a controlled air source to urge the piston rod outwardly. The position of the guide rails 94A and 94B can be adjusted by positioning the piston rod 110 to a zero setting position of the guide rails, and then any movement of the guide rails caused by excessive forces on the pusher paddles will result in a signal to be generated indicating that there is a jam or some other problem the pusher paddles will be moved against the constant bias force of the air pressure in the cylinders.

Figure 9:
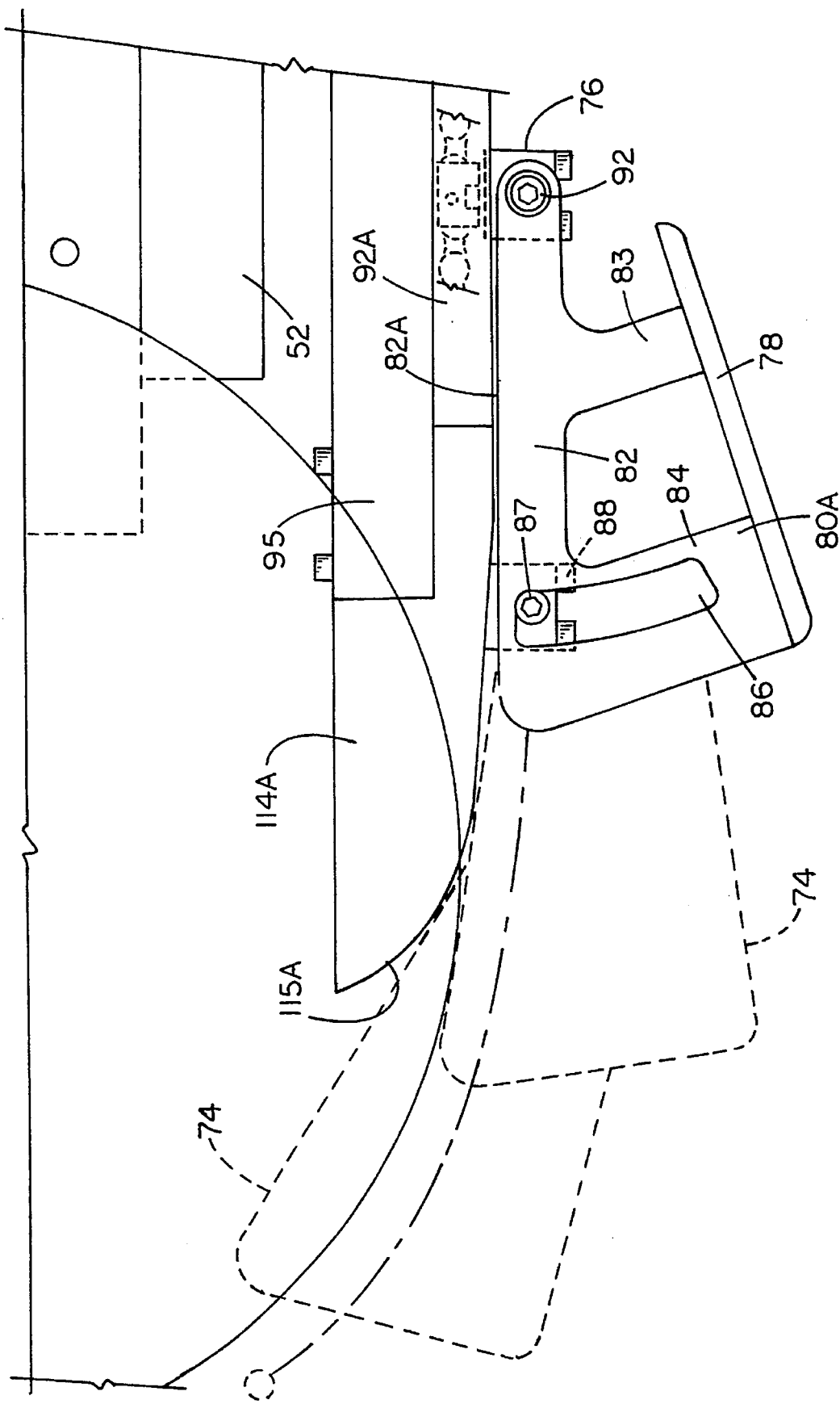
FIG. 9 is an enlarged top plan view of an input end of the crosspush conveyor, where paddles first engage a group of cans to be loaded.

The guide rails 94A and 94B extend essentially between the sprockets 54 and 56 and parallel a straight length of the chains 60A and 60B on the work side of the crosspush conveyor. The sprocket 54 rotates as indicated by the arrow 54A and the inlet end of the crosspush conveyor and the guide rail assembly 93 is provided with lead in rail guides 114A and 114B at the end of each of the respective guide rails 94A and 94B. These are shown in FIG. 9, 10 and 11 perhaps best, and they engage a pusher paddle assembly 74 that has pivoted inwardly as it moved around sprockets 54, and guiding the pusher paddle assembly 74 into its working position as it moves off the sprockets 54. The plate like supports 80A and 80B will start to slide along the guide rails 94A and 94B adjacent to the groups of cans to be moved. Lead in rail guides 114A and 114B have rounded ends 115A and 115B that are engaged by the pusher paddle assemblies 74, and specifically the guide surfaces 82A, as each pusher paddle starts to move around the corner, generally as shown in dotted lines in FIG. 9. Then, as the chains 60A and 60B continue to move the pusher paddle assembly 74, the pusher paddle will come to a usable or working position as shown in solid lines in FIG. 9.

The rail guides 114A and 114B thus engage both of the plate like supports 80A and 80B on each pusher paddle as the pusher paddle assemblies 70 are moved into working position.

At the discharge end of the guide rails 92A and 92B on the can side of the conveyor and adjacent the sprockets 56, as shown in FIG. 6, the guide rails 92A and 92B and the support blocks are beveled as shown by the surface 116 in FIG. 6 to permit the pusher paddle assemblies 74 to retract by pivoting inwardly toward the center of the sprocket 56 as the pusher paddle assemblies move around sprocket.

The chains 60A and 60B are guided between the sprockets 54 and 56 by a track shown in cross section FIG. 7, for example. The track comprises a H-shaped elongated track member 120 having low friction material guides 122 positioned and held therein. The guides 122 are of size to receive and guide the rollers or bushings at each of the pins of roller chains 60A and 60B. These chain bushings are shown at 124 in FIG. 7. The upper and lower roller chains 60A and 60B both are suitably guided between the sprockets 54 and 56 on both the drive side (adjacent the cans) and the return side of the crosspush conveyor 50. The H-shaped cross section guides are held in place with suitable cap screws 126 which have heads that fit into slots on the side of the H-shaped cross section rails, and the cap screws fasten to brackets which are in turn fastened onto the support plate 52. Note that the H-shaped cross section permit the low friction guides to be open toward the bottom and the top.

When the chains 60A and 60B are driven and the crosspush conveyor is operated, the pusher paddle assembly 65 exiting the sprocket 54 will engage a group of cans indicated at 48A, and as the plates continue to move, they will move the group of cans inwardly toward the cartons on conveyor 14, the movement of the groups of cans is shown at the successive stages 48A–48G. When the pusher paddle assemblies reach the 48G position, which is the end of the straight length of the conveyor, and the pusher paddles continue to move around the sprocket 56, and the bevel cut 116 will permit the heel of the pusher paddle to retract or pivot away from the cans and the cartons as guided by the slot 86 and the shoulder bolt 87 on the block attached to the respective chains. This will move the heel of the pusher paddle out of the way of the loaded carton and the plate will not cause an interference with the cartons that are further down from the group of cans 48G, which are fully within a carton in the position shown.

The bevel cut 116 permits the heel to retract so that the paddle pushing surface essentially remains parallel to the end of the carton until it will clear the carton and move around the sprockets 56.

The chain guide track 120 on the return side of the conveyor, opposite from the groups of cans 48A–48G, guides the roller chain links as they move, but no guide rails 94A or 94B are present for engaging the supports 80A and 80B of the respective pusher paddle assemblies. The pusher paddles are shown as being in a working position on that side of the conveyor, but they do not necessarily have to be in such position. Again, when the pusher paddle assemblies move around the sprocket 54, they are moved by the guide 114A and 114B into their working position.

A smooth operating crosspush assembly is thus arrived at, with no need for cam tracks or cam followers.

The roller chains are endless flexible members and belts, chain belts, cables and other similar members mounted on rotatable members can be used. Pulleys or sheaves would replace the sprockets for other flexible members.

The crosspush conveyor thus operates so that a line between the axes of the drive and idler sprockets and guide rails 92A and 92B and thus the path of the paddles also are at an angle to the direction of movement of the product conveyor, the path is at an angle relative to the direction of movement of the articles to be pushed laterally on the product conveyor. With synchronization of the speed of the crosspush conveyor so that the forward component or vector of speed is the same as the forward component or vector of the speed of the product or articles and cartons, the cans or other articles are placed into the cartons smoothly and efficiently. It should be noted that a single layer of cans can be loaded with the crosspush conveyor of the present invention, merely by keeping the crosspush conveyor above the conveyor that is conveying the cans. As shown, the crosspush conveyor fits between the conveyors used for both the upper and lower layers of cans. The pusher paddles do not require a cam control in the path of movement of the paddle, but the paddles are merely supported in position by sliding against support rails on the frame.

Although the present invention has been described with reference to preferred embodiments, workers skilled in the art will recognize that changes may be made in form and detail without departing from the spirit and scope of the invention.

What is claimed is:

1. A crosspush conveyor for use in a package loading machine, having a frame and a product conveyor for moving articles along the product conveyor in a first direction of movement, the crosspush conveyor moving the articles laterally of the first direction of movement, and the crosspush conveyor comprising end guides supporting a moving endless flexible member having a first length between the end guides positioned adjacent to articles to be moved, a plurality of paddles pivotally mounted to said endless flexible member about axes that are generally perpendicular to the first direction of movement, said paddles each comprising a pusher plate for engaging the articles and at least one plate like support having a plane perpendicular to the pusher plate and on a side of the pusher plate opposite from the articles, said plate like support having an edge, said paddles having at least a limited free pivotal movement relative to the endless flexible member, and a guide support fixed relative to the frame on a side of the paddles opposite from the articles and slidably engaging the edges of the plate like support for preventing the paddles from moving about their axes in a first pivotal direction away from the articles beyond a working position as the paddles move along the first length of said endless flexible member, said guide support ending adjacent an end of the first length of the endless flexible member so the paddles are free to move in the first pivotal direction beyond the working position after moving past the guide support.

2. The crosspush conveyor of claim 1 wherein there are a pair of parallel plate like supports on each paddle, one above the endless flexible member and one below the endless flexible member and a slot provided in each of the plate like supports, and a stop pin mounted on the endless flexible member and positioned within the slot to limit the pivoting of each of the paddles.

3. The crosspush conveyor of claim 1, wherein said paddles have conveyor plate members that have surfaces positioned at an angle relative to the first length, said surfaces being parallel to the direction of movement of the packages to be loaded as the paddles slide along the support.

4. The crosspush conveyor of claim 1, wherein said paddles have spaced planar base surfaces, and the support comprises spaced guide rails, said guide rails having outwardly facing guide surfaces positioned to slidably engage and support the planar base surfaces.

5. The crosspush conveyor of claim 4, wherein the end guides comprise rotatable members defining a plane of rotation with the endless flexible members supported adjacent the periphery of the rotatable members, said paddles being free to move inwardly toward centers of the rotatable members as the endless flexible members move around the rotatable members, the guide rails having rounded end portions for engaging the paddles and moving said paddles to a working position as the paddles move past the rotatable member at one end of the crosspush conveyor and engage articles for lateral movement.

6. The crosspush conveyor of claim 1 and a pair of pivoting blocks for each of the paddles, said pivoting blocks being attached to the endless flexible member at spaced locations, said paddles comprising a pair of plates that are spaced apart and the first of the blocks fitting between plates and receiving pivoting pins passing through said plates and a second of said blocks fitting between said plates and carrying stop pins at opposite ends thereof, said stop pins extending into slots that are formed in the plates for limiting the pivoting of the plates and thus the paddle.

7. The crosspush conveyor of claim 6 and stop pins prevent the trailing portion of the plates from moving away from the block more than a preselected amount.

8. The crosspush conveyor of claim 4, and a pivot support to mount one end of the guide rails near one end of the crosspush conveyor for pivotally mounting the guide rails with respect to the frame, and an adjustable holder mounting to an opposite end of the guide rails to position the guide rails relative to the pivot support.

9. The crosspush conveyor of claim 4, wherein said guide rails are mounted to pneumatic cylinders, and means associated with the pneumatic cylinders to provide a signal indicating excessive loads on the paddles as reacted by the guide rails.

10. The crosspush conveyor of claim 1 and a separate pneumatic cylinder mounting opposite ends of the support, said pneumatic cylinders controlling the load applied to the support for holding the paddles in their working position, and means to provide a sense signal when the load on the support causes movement of components of the pneumatic cylinders.

11. A crosspush conveyor for use in a package loading machine, having a frame and a product conveyor for moving articles along the product conveyor in a first direction of movement, the crosspush conveyor moving the articles laterally of the first direction of movement, and the crosspush conveyor comprising end guides supporting a moving endless flexible member having a first length between the end guides positioned adjacent articles, a plurality of paddles pivotally mounted to said endless flexible member about axes that are generally perpendicular to the first direction of movement, said paddles having at least a limited free pivotal movement relative to the endless flexible member, and a flat support having a guide edge fixed relative to the frame, the guide edge slidably engaging an edge surface of each of the paddles for preventing the paddles from moving about their axes in a first pivotal direction away from the articles beyond a working position as the paddles move along the first length of said endless flexible member, said paddles being free to move in the first pivotal direction beyond the working position after moving past the support, said paddles having conveyor plate members that have surfaces positioned at an angle relative to the first length, said surfaces being parallel to the direction of movement of packages to be loaded as the paddles slide along the support.

12. A crosspush conveyor for use in a package loading machine, having a frame and a product conveyor for moving articles along the product conveyor in a first direction of movement, the crosspush conveyor moving the articles laterally of the first direction of movement, and the crosspush conveyor comprising end guides supporting a moving endless flexible member having a first length between the end guides positioned adjacent articles to be conveyed, a plurality of paddles pivotally mounted to said endless flexible member about axes that are generally perpendicular to the first direction of movement, said paddles having at least a limited free pivotal movement relative to the endless flexible member, and a support fixed relative to the frame slidably engaging the paddles for preventing the paddles from moving about their axes in a first pivotal direction away from the articles beyond a working position as the paddles move along the first length of said endless flexible member, said paddles being free to move in the first pivotal direction beyond the working position after moving past the support, said paddles having a substantially planar base edge surface and the support comprises a guide rail extending along the first length and having an outwardly facing edge surface to slidably engage and support the planar base edge surfaces of the paddles as the paddles move along the first length.

13. A crosspush conveyor for use in a package loading machine, having a frame and a product conveyor for moving articles along the product conveyor in a first direction of movement, the crosspush conveyor moving the articles laterally of the first direction of movement, and the crosspush conveyor comprising end guides supporting a moving endless flexible member having a first length between the end guides positioned adjacent articles, a plurality of paddles pivotally mounted to said endless flexible member about axes that are generally perpendicular to the first direction of movement, said paddles having at least a limited free pivotal movement relative to the endless flexible member, and a support fixed relative to the frame slidably engaging the paddles for preventing the paddles from moving about their axes in a first pivotal direction away from the articles beyond a working position as the paddles move along the first length of said endless flexible member, said paddles being free to move in the first pivotal direction beyond the working position after moving past the support, and a separate pneumatic cylinder mounting opposite ends of the support, said pneumatic cylinders controlling the load applied to the support for holding the paddles in their working position, and means to provide a sense signal when the load on the support causes movement of components of the pneumatic cylinders.

* * * * *